United States Patent

[11] 3,630,831

| [72] | Inventor | Hendrik Jongetjes<br>Heemskerk, Netherlands |
|---|---|---|
| [21] | Appl. No. | 771,304 |
| [22] | Filed | Oct. 28, 1968 |
| [45] | Patented | Dec. 28, 1971 |
| [73] | Assignee | Koninklijke Papierfabrieken Van Gelder Zonen N.V. |
| [32] | Priority | Nov. 1, 1967 |
| [33] | | Netherlands |
| [31] | | 6714866 |

[54] BINDING AGENT FOR NONWOVEN MATERIALS AND NONWOVEN MATERIAL MADE THEREWITH
15 Claims, No Drawings

[52] U.S. Cl. ................................................. 162/156,
162/157, 162/167, 162/168, 162/174, 162/175,
162/177, 162/183, 260/13, 260/15, 260/17.3,
260/29.4 UA, 260/29.6 NR, 260/851

[51] Int. Cl. ............................................... D21f 11/00

[50] Field of Search ............................................. 162/167,
168, 173, 174, 175, 177, 183, 185, 156, 157, 157
C; 260/29.6 B, 15, 73, 6, 13; 8/115.6

[56] References Cited
UNITED STATES PATENTS

| 2,322,888 | 11/1940 | Schwartz | 260/29.6 B |
|---|---|---|---|
| 2,510,257 | 4/1946 | Robinson | 260/29.6 B |
| 2,998,344 | 8/1961 | Carlson | 162/157 C |
| 3,233,581 | 12/1965 | Sommer | 162/157 |
| 3,329,657 | 7/1967 | Straydins | 162/168 |
| 3,376,189 | 4/1968 | Nystrom | 162/156 |
| 3,102,838 | 9/1963 | Hervey | 162/178 |
| 3,207,613 | 9/1965 | Merrill | 260/6 |
| 3,298,901 | 1/1967 | Piersol | 162/168 |

FOREIGN PATENTS

| 290,006 | 6/1965 | Netherlands |
|---|---|---|

OTHER REFERENCES

Technology of Coated and Processed Papers, Mosher, 1952, pp. 108–122

*Primary Examiner*—S. Leon Bashore
*Assistant Examiner*—Richard H. Anderson
*Attorney*—Stevens, Davis, Miller & Mosher

ABSTRACT: A suspension of a binding agent for nonwoven materials is prepared by dispersing particles of a polymer swellable in cold water and soluble in warm water such as starch or polyvinyl alcohol in a solution of a cross-linking agent such as formaldehyde and a cross-linking catalyst such as hydrochloric acid wherein the particles swell and substantially completely absorb the solution. This mass is maintained at substantially room temperature until the cross-linking agent partially reacts and thereafter the dispersion is diluted. The diluted dispersion may be partially neutralized to a pH at which the cross-linking agent is substantially prevented from reacting with the polymer. The binding agent is dispersed in a fiber dispersion and a web is formed which is thereafter heated to at least 140° C. to complete the cross-linking of the polymer.

BINDING AGENT FOR NONWOVEN MATERIALS AND NONWOVEN MATERIAL MADE THEREWITH

The invention relates to a process for the preparation of a binding agent for nonwoven materials. The invention relates in addition to a method for manufacturing bond nonwoven materials by means of the binding agent prepared according to the invention, as well as to nonwoven materials, manufactured according to this method, and products made thereof.

When manufacturing nonwoven materials, it is of technological and economical importance to be able to use fairly cheap, water-soluble, natural, modified natural, or synthetic polymeric substances as a binding agent. Said binding agents have the great disadvantage that the nonwoven material, bound by said binding agents, is sensitive to water, unless special care is taken to prevent this. A known provision against the sensitivity to water of those binding agents is the addition of a chemical compound, capable of cross-linking the water-soluble polymer to such an extent, that it is no longer water-soluble.

In Dutch patent application No. 290,006, open to public inspection, a method for manufacturing a nonwoven material from cellulose fibers has been described, containing polyvinyl alcohol cross-linked with formaldehyde. This method is a two-step method starting either from a nonwoven web, already formed, and impregnating it with a solution of polyvinyl alcohol, formaldehyde and an aqueous acid, or from a nonwoven web, already formed, containing fibers of polyvinyl alcohol and impregnating it with a solution of formaldehyde and an acid. After being impregnated, it is dried and heated in order to cross-link the polyvinyl alcohol.

It is pointed out in said patent application, that the formaldehyde must cross-link only the polyvinyl alcohol. The cellulose fibers should not be cross-linked, or hardly so, because otherwise the fibers turn brittle and will have little absorptive power. According to the application there would be hardly any cross-linking of the cellulose. It does not say, however, which measures are taken to prevent the cellulose from cross-linking. It does not seem probable either, that this will not occur in said method. The variant of this known method, in which a nonwoven web, containing fibers of polyvinyl alcohol, is impregnated with formaldehyde, has the disadvantage that the fibers of polyvinyl alcohol are already forming a coating, containing acetal, before being impregnated, this making it more difficult for the cross-linking agent to penetrate into said fibers. Moreover, this known method is not suitable either for manufacturing bound nonwoven materials by a wet process. It is necessary in the wet process to add the binding agent to the fiber suspension for supplying the nonwoven web to be formed with a sufficient initial wet strength. Solutions of binding agents are not suitable for the purpose, because on dehydrating the fiber suspension when forming the nonwoven web, great amounts of binding agent would be lost with the water.

It has been found, according to this invention, that a binding agent is obtained which is very useful in manufacturing bound nonwoven materials by the wet process by providing a cold water swellable and warm water soluble natural, modified natural, or synthetic polymeric binding agent in a solution of a cross-linking agent and a cross-linking catalyst swelling in water, the relative ratio between the amount of binding agent and the amount of solution being such, that the solution is completely or substantially taken up by the particles of the binding agent, keeping the swollen particles of the binding agent at room temperature, or a slightly elevated temperature, for such a period that the cross-linking agent reacts partially, but the binding agent is still soluble in warm water, subsequently diluting the mass consisting of swollen particles of binding agent with water and partially neutralizing it, until the suspension obtained has a pH at which the cross-linking agent is either just prevented from reacting or at which it hardly reacts at all. In this form the binding agent may be kept for quite a time without the reaction in the particles of the binding agent proceeding to such an extent, that the binding agent is no longer useful. The suspension may be put on the market and stored, if so required.

Also, according to the invention a bound nonwoven material is obtained, by adding the suspension of swollen particles of binding agent obtained by the process described above to a suspension of fibers in water, dehydrating the fiber suspension in the conventional way, forming a nonwoven material from it, drying the nonwoven material obtained, and finally cross-linking the binding agent by heating the nonwoven web at a temperature of at least 145° C.

For carrying out the process according to the invention, an aqueous solution of a cross-linking agent and a cross-linking catalyst is first of all prepared. By the term "cross-linking agent" is meant any polyfunctional compound which is able to form cross-links between the molecules of the binding agent with which it is brought into contact. Generally, the cross-linking agents are those which are used in the textile industry for cross-linking cellulose. Such cross-linking agents have been described in the book of J. T. Marsh, Self-smoothing Fabrics (Chapman and Hall Ltd., London 1962), Chapters 6, 7 and 8. Cross-linking agents suitable for practice of this invention include aldehydes, like formaldehyde, glyoxal and acrolein; synthetic resin precondensates obtained by the reaction of an aldehyde, generally with compounds containing nitrogen, like dimethylolurea, dimethylolethylene urea, di- and trimethyloltriazon dimethyl uron, di- and trimethylolmelamine and other cyclic or noncyclic, water-soluble or non-water-soluble precondensates of urea and melamine-formaldehyde. Apart from the above, other known cross-linking agents, too, may be used, such as diepoxides, epichlorohydrin and derivatives thereof, dichloropropanols, $\beta$-substituted diethyl sulfones, sulfonium salts, N-methylolacrylamide and methacrylamide and derivatives thereof, diisocyanate, etc. Said substances are partially acting as cross-linking agents in alkaline medium, so that in this case a substance having an alkaline reaction has to be used as the cross-linking catalyst. Trimethylolmelamine is preferably used.

Acid reacting substances, substances having an acid reaction at an elevated temperature, and substances which react with the cross-linking agent to form an acid, are the preferred catalysts to be used together with those cross-linking agents. Typical examples are inorganic acids, e.g., hydrochloric acid, sulfuric acid, phosphoric acid, boric acid; organic acids, such as formic acid, acetic acid, lactic acid, oxalic acid, tartaric acid, citric acid, salts having an acid reaction, such as magnesium chloride, aluminum chloride, zinc fluoborate; ammonium salts which form an acid with the cross-linking agent, such as ammonium chloride, ammonium phosphate, ammonium thiocyanate, etc. A general description of the catalysts is given in the cited book of J. T. Marsh, Self-smoothing Fabrics, Chapter 9.

Generally, a solution containing 0.5 percent to 50 percent by weight, preferably 1 percent–25 percent by weight of a cross-linking agent is used as a starting material. The amount of catalyst generally amounts to 0.025 percent–0.5 percent by weight, calculated on the cross-linking agent, the exact amount depending on the nature of the particular cross-linking agent used.

The binding agent for the nonwoven materials is now added to the solution containing the cross-linking agent and catalyst. The binding agent must swell in the solution, but should not form a solution or sol with it. Each particle of the binding agent forms a semolinalike lump, but said lumps have relatively little coherence. The binding agent is added to the solution in the form of a power or granules having a particle size of 50 to 250 microns. The particles of the binding agent are capable of absorbing, when swelling, 10 times their own weight of water, the size of the particles increasing considerably. The amount of solution absorbed by the binding agent depends on the kind of binding agent, the size of the particles and on the pH and the temperature of the solution. The ratio between the amount of binding agent and the amount of solution is chosen such that the particles will swell completely. For the sake of efficiency a little more of the solution is used than can be absorbed by the binding agent, to keep the swollen mass stirrable. When the particles of the binding agent are swelling, the fairly small molecules of the cross-linking agents and of the catalyst are absorbed by the particles of the binding agent together with the swelling-water and those molecules diffuse through the mass of the swollen particles.

The concentration of the cross-linking agent in the solution may be adjusted such that 1 percent–50 percent by weight of cross-linking agent, calculated on the binding agent, is present therein. More specifically 5 percent–25 percent by weight and preferably 8 percent–15 percent by weight of cross-linking agent is used. Suitable binding agents are natural, modified natural and synthetic polymeric substances which meet the requirement of swelling in cold water and of solubility in warm water. Suitably is therefore easily ascertained. Typical examples are alginates, carboxymethyl cellulose, methyl cellulose, hydroxyethyl cellulose and other cellulose derivatives, locust bean gum and its derivatives, starch derivatives, proteins, like casein and animal glue, and preferably polyvinyl alcohol. When polyvinyl alcohol is used as binding agent it should have a degree of saponification of 98 percent–100 percent which corresponds with an ester number of 0–25 (the ester number being the amount of potassium hydroxide in milligrammes required for saponifying 1 gram of polyvinyl alcohol). This kind of specification of polyvinyl alcohol is due to the fact that polyvinyl alcohol is prepared by the saponification of polyvinyl acetate. The polyvinyl alcohol used as a binding agent according to this invention should have a viscosity in a 4 percent aqueous solution at 20° C. of 10 to 60 centipoises. If the polyvinyl alcohol has a low ester number it should have a low viscosity within the mentioned range, whereas a higher viscosity within this range is required if the ester number is high in the range of 0–25. The most preferred type of polyvinyl alcohol has a degree of saponification of 99 percent and a viscosity measured in the specified manner of 30 centipoises.

The swollen mass of binding agent is now kept for some time at a temperature not exceeding 50° C. to allow the cross-linking agent and the catalyst to diffuse through the swollen particles of the binding agent, and to start the reaction between the components brought into contact with each other. The reaction is allowed to proceed to such an extent that the particles of the binding agent are still soluble in warm water. During this period of quiescence there occurs some cross-linking and additional condensation. The period of contact required to achieve this effect may be fairly long, 24 hours for instance, but by proper combination of cross-linking agent, catalyst and temperature, the period may be shortened to 15–60 minutes.

The mass of binding agent is subsequently thinned with water. Surprisingly enough, it appears that the cross-linking agent either does not diffuse at all from the particles of the binding agent into the diluent water, or does so only to a slight extent. The catalyst, the molecules of which have not been bound or increased in size during the proceeding phase, however, do diffuse from the binding agent into the diluent water because of which the pH in the particles of the binding agent moves towards the neutral point. This causes the reaction which started in the particles to stop completely, or nearly completely. This is the case with the preferred cross-linking agents which are active in an acid medium when, following the diffusion of the catalyst from the particles of the binding agent, a stationary condition has been arrived at, and the suspension has a pH of about 5. When using cross-linking agents which are active in an alkaline medium, the pH of the suspension should amount to about 8. This condition can be obtained by controlling the amount of diluent water, and also by using a smaller amount of diluent water and adding a neutralizing agent for the catalyst. It goes without saying that care has to be taken that a sufficient amount of catalyst remains in the swollen particles to effect the total cross-linking to be carried out later. When one does not use a neutralizing agent for the catalyst, the diluted suspension of swollen lumpy particles of binding agent may have a solids content of 1 percent–10 percent by weight. Since the reaction in the particles of binding agent has stopped, or at any rate has been very much slowed down, the suspension of binding agent can be stored for quite a time, be transported and put on the market as such, to be used as a binding agent in the production of bound nonwoven materials.

For the production of a bound nonwoven material the stabilized suspension of binding agent, prepared according to the process described above, is added to a fiber suspension without separating the swollen particles from the suspension. An amount of suspension of binding agent is added such that the dry binding agent content amounts to 10 percent–50 percent by weight, preferably 15 percent–30 percent by weight, calculated on the dry fibers. Fibers to be used by a natural and regenerated cellulose fibers, synthetic fibers such as polyamide, polyester, polyacrylic, polypropylene fibers and copolymer fibers, inorganic fibers such as glass fibers and mixtures thereof. The length of the fibers may vary from 3 to 25 millimeters, the preferred length being about 6 millimeters. The ratio of length to diameter of the fibers should be no more than 500:1. The concentration of the fibers in the aqueous suspension should be no more than 0.1 percent by weight.

After the newly obtained suspension of fibers and binding agent is mixed homogeneously, a nonwoven material is made from the suspension by the wet process in a machine for the production of nonwoven materials. Hand-formed sheets of nonwoven materials may be made in a similar way in a laboratory sheet forming apparatus. For this purpose the suspension is dehydrated until a moisture content of 50 percent–200 percent by weight has been obtained, calculated on the total amount of solids of the nonwoven web. When a cross-linking agent active in an acid medium and a catalyst, either being acid or acid-producing, have been used in the production of the binding agent, the pH of the nonwoven web when still wet may amount to about 6. A great advantage in using the binding agent according to the invention is that on dehydrating the suspension of the wire of the machine none of the binding agent is lost with the water running off, as contrasted with using a water-soluble binding agent.

The remaining moisture is removed from the formed nonwoven web in a dryer. The drying can be done by irradiation, hot air, contact drying, on heated rollers, or a combination of said methods.

During the drying process the nonwoven web and the water still present therein are warmed, causing the particles of the binding agent to dissolve in the water.

As the binding agent has become cross-linked already to some extent, and the viscosity of the solution is increasing by evaporation of water, the solution of the binding agent obtained does not flow across the fibers in a regular flow. Moreover, the cross-linking of the binding agent proceeds in this phase owing to the increase in temperature and the evaporation of the solution. This causes the concentration of the catalyst to increase and the pH to reach values differing more from the neutral point. When in the production of the binding agent an acid, or acid-producing catalyst has been used, the pH will reach a value of about 4 during the drying. Due to capillary activity the thickening solution of binding agent creeps towards the places where the fibers are touching each other, so that after drying the fibers have been linked together at the points of contact.

In order to complete the cross-linking reaction the bound nonwoven web is then heated to a temperature of at least 140° C. for at least a few minutes. At higher temperature, the heating time is shortened. By said heat treatment of at least the binding agent and the nonwoven web bound with it obtain an increased warm water resistance, and the strength properties are also improved. The extent of the improvement depends on the kind and the amount of the binding agent and of the cross-linking agent.

The nonwoven webs made according to the invention have good absorbing powers, insofar as they consist of hydrophilic fibers, and they may therefore be used as handkerchiefs, towels, garments, etc. In addition to this the fibers may be used as reinforcing materials, supporting materials, for instance for polyvinyl chloride; also as filtering material etc.

The invention will be further elucidated with reference to the following examples.

EXAMPLE I

In a beaker with a content of 1,000 ml. there are put 500 ml. of distilled water at 20° C. containing 1 percent by weight of formaldehyde. The pH of the solution is adjusted to 4 with the aid of diluted hydrochloric acid. While stirring vigorously 50 g. of a cold water swelling and warm water soluble carboxymethyl cellulose is poured into the solution. The carboxymethyl cellulose has a degree of substitution of 0.3 and a viscosity in a 2 percent aqueous solution (obtained by dissolving the carboxymethyl cellulose in warm water and cooling the solution obtained to 20° C.) of 15 centipoises. The carboxymethyl cellulose starts swelling and practically absorbs the whole of the solution. An extremely thick, semolinalike, lumpy mass is obtained, which is kept at room temperature for 24 hours. The mass is subsequently diluted with water to a suspension of 1,000 ml., while stirring vigorously.

Ten milliliters of said suspension is added to a suspension of 1 g. of staple fibers of regenerated cellulose of 1.5 den. with a length of 6 mm. in 1,000 ml. of water. The fibers and the binding agent are homogeneously mixed in a laboratory sheet-forming apparatus after the suspension has been diluted to 10:1. A nonwoven web is then formed by dehydration, said nonwoven web being dried at 150° C. and subsequently heated at 140°–150° C. for 3 minutes. The bound nonwoven material produced has a wet tensile strength amounting to 27.5 percent of the dry tensile strength. The nonwoven web has a moderate warm water resistance.

For the sake of comparison, a nonwoven web is produced according to the process described, with the aid of a binding agent, prepared in the manner described above with, however, no hydrochloric acid being added to the solution of formaldehyde.

The wet tensile strength of the nonwoven web only amounts to 15 percent of the dry tensile strength. On boiling in water the nonwoven web completely disintegrates into fibers.

When carboxymethyl cellulose is used alone as a binding agent, as in this example, i.e., without any formaldehyde, the wet tensile strength of the nonwoven web produced is nil.

EXAMPLE II

Five grams of N,N'-dimethylol ethylene urea and 25 mg. of ammonium thiocyanate are dissolved in 500 ml. of distilled water in a 1,000 ml. beaker. While stirring vigorously, 50 g. of a cold water swelling and warm water soluble methyl ether of starch are poured into the solution. The solution is for the greater part absorbed by the starch particles. The mass is kept at 35° C. for 2 hours, the swelling still increasing and the mass becoming still thicker. Subsequently the mass is diluted with water, with stirring, to a suspension of 1,000 ml.

Twenty milliliters of that suspension is added to 1,000 ml. of suspension of glass fibers with a length of 6 mm. and a diameter of 9 microns in water with a solids content of 0.2 percent by weight. After being diluted to 10:1 the suspension is stirred homogeneously, a glass fiber nonwoven web formed from it, which is dried at 150° C. and subsequently heated at 140° C. for 3 minutes. The wet tensile strength of the glass fiber nonwoven web formed in this way amounts to 53 percent of the dry tensile strength. The nonwoven web does not disintegrate on boiling.

For the sake of comparison, a glass fiber nonwoven web is produced in a similar way with the same starch as a binding agent, but without the use of a cross-linking agent or catalyst.

The wet tensile strength of the bound nonwoven web amounts to only 10 percent of the dry tensile strength.

After-treatment of the just-mentioned nonwoven web with a solution of the aforementioned urea formaldehyde precondensate and ammonium thiocyanate in water followed by drying at 105° C. and heating at 140° C. for 3 minutes imparts to the nonwoven web a wet tensile strength that amounts to 35 percent of the dry tensile strength.

EXAMPLE III

Fifty milliliters of a 1 percent solution is prepared from a cationic acid colloid of a trimethylolmelamine in a 1,000 ml. beaker. This 1 percent solution is prepared by adding 8.4 ml. of 32 percent aqueous hydrochloric acid to 184 ml. of water. 25 grams of Melamine Resin BC 27 (a commercial product available from British Industrial Plastics) is added to the acid solution with stirring, thus yielding 208 ml. of a 6 percent solution. After half an hour the solution is diluted with water to a concentration of 1 percent (see Paper Trade J., Nov. 11, 1948, 49). The pH of said solution amounts to 2. Fifty grams of powdered polyvinyl alcohol (degree of saponification 99 percent, viscosity 30 cp. in a 4 aqueous solution at 20° C.; 98 percent by weight of the powder has a particle size within the range between 50 and 250 microns) is dispersed into this solution with stirring. After 20 minutes of stirring the particles of the polyvinyl alcohol have become swollen. Subsequently the mass is diluted with water to a suspension of 1,000 ml. with stirring.

Fifteen milliliters of said suspension is added to 1,000 ml. of a suspension of cotton linters with a degree of beating of 20° S. R. and regenerated fibers of cellulose of 1.5 den. with a length of 6 mm. in the proportion of 1:3. The fiber content of the suspension amounts to 0.25 percent by weight. When the suspension has been diluted to 10:1, it is homogeneously stirred and a nonwoven web is formed in a sheet former, said nonwoven web being dried at 105° C. and subsequently heated at 140° C. for 3 minutes.

The nonwoven web produced in this way has a basis weight of 70 g./m². The wet tensile strength amounts to 51 percent of the dry tensile strength.

The nonwoven web is highly absorbent and is therefore suitable as a substitute for textiles.

It may be used, for instance, for handkerchiefs and garments. The nonwoven web does not disintegrate on boiling.

EXAMPLE IV

Ten grams of epichlorohydrin is dispersed as homogeneously as is possible with vigorous stirring in 500 ml. of distilled water in a 1,000 ml. beaker. With the aid of a diluted solution of sodium hydroxide the pH of the dispersion is adjusted to 8–9.

While stirring vigorously, 50 g. of the same type of powdered polyvinyl alcohol as used in example III are poured into the dispersion. The polyvinyl alcohol absorbs practically the whole amount of liquid in swelling. The swollen mass is kept at 30°–35 C. for 16 hours. After this the mass is diluted with water to 1,000 ml. of suspension with stirring.

Twenty milliliters of the suspension thus obtained is added to 1,000 ml. of a suspension containing 2 g. of polyethylene terephthalate fibers of 1.5 den. with a length of 6 mm. After being diluted 10:1, the suspension is stirred homogeneously and a nonwoven web is formed from it in a sheet former. The nonwoven web is dried at 105° C. and subsequently heated at 140° C. for another 3 minutes. The wet tensile strength of the bound nonwoven material thus produced amounts to 34 percent of the dry tensile strength.

By way of comparison a nonwoven material is formed in the same way, but without addition of epichlorohydrin as a cross-linking agent. This nonwoven web has practically no wet strength.

What is claimed is:

1. A process for producing a suspension of a binding agent for nonwoven materials comprising;

dispersing particles of a natural, modified or synthetic polymer swellable in cold water and soluble in warm water selected from the group consisting of alginates, carboxymethyl cellulose, methyl cellulose, hydroxyethyl cellulose, galactomannanes, starches and polyvinyl alcohol, in a solution of a cellulose cross-linking agent and a cross-linking catalyst in water, wherein the polymer particles swell, the ratio of the amount of polymer to the amount of solution being such that the solution is substantially completely absorbed by the particles of the polymer, maintaining the swollen particles at substantially room temperature for a time such that the cellulose cross-linking agent partially reacts but the polymer is still soluble in warm water, and subsequently diluting the dispersion of swollen particles with water.

2. The process of claim 1 wherein the diluted dispersion of swollen particles is partially neutralized until the pH of the suspension is such that the cross-linking agent is substantially prevented from reacting.

3. The process according to claim 1 wherein the cross-linking agent is an aldehyde or a synthetic resin precondensate obtained by reaction of an aldehyde with a nitrogen containing compound.

4. The process according to claim 1 in which the cross-linking agent is trimethylolmelamine.

5. The process according to claim 1 wherein the cross-linking agent is used in an amount of 5–25 percent by weight based on the polymer.

6. The process according to claim 1 wherein the particles of the polymer are caused to swell in a solution containing 1 percent–25 percent by weight of the cross-linking agent.

7. The process according to claim 1 wherein the cross-linking catalyst is selected from the group consisting of organic and inorganic acids.

8. The process according to claim 1 wherein the catalyst is used in an amount of 0.025 percent–0.5 percent by weight based on the amount of cross-linking agent.

9. A suspension of binding agent for nonwoven materials produced according to the process of claim 1.

10. The process for producing bound nonwoven materials comprising dispersing the suspension of claim 9 in a suspension of fibers in water, depositing this mixed suspension and removing water therefrom to form a web, drying the nonwoven web and heating the same at a temperature of at least 140° C.

11. A process according to claim 10 wherein 15 percent–30 percent by weight of binding agent calculated as dry material on the dry fibers is deposited in said web.

12. A bound nonwoven web produced according to the process of claim 10.

13. A bound nonwoven web according to claim 12, wherein the fibers of the web are glass fibers.

14. A bound nonwoven web according to claim 12, wherein the fibers of the web are regenerated cellulose fibers.

15. A bound nonwoven web according to claim 12, wherein the fibers of the web are synthetic polymer fibers.

* * * * *